United States Patent
Campbell et al.

(10) Patent No.: US 12,093,981 B2
(45) Date of Patent: Sep. 17, 2024

(54) STREAMLINED MOBILE ADVERTISING FOR DIGITAL PASSES

(71) Applicant: Vibes Media LLC, Chicago, IL (US)

(72) Inventors: Alexander Gates Campbell, Chicago, IL (US); John Haro, Chicago, IL (US)

(73) Assignee: Vibes Media LLC, Chicago, IL (US)

( * ) Notice: Subject to any disclaimer, the term of this patent is extended or adjusted under 35 U.S.C. 154(b) by 513 days.

(21) Appl. No.: 16/750,617

(22) Filed: Jan. 23, 2020

(65) Prior Publication Data

US 2020/0160396 A1 May 21, 2020

Related U.S. Application Data

(63) Continuation of application No. 14/663,928, filed on Mar. 20, 2015, now abandoned.

(60) Provisional application No. 61/968,011, filed on Mar. 20, 2014.

(51) Int. Cl.
*G06Q 30/00* (2023.01)
*G06Q 30/0251* (2023.01)

(52) U.S. Cl.
CPC ..... *G06Q 30/0267* (2013.01); *G06Q 30/0261* (2013.01)

(58) Field of Classification Search
None
See application file for complete search history.

(56) References Cited

U.S. PATENT DOCUMENTS

| | | | | |
|---|---|---|---|---|
| 7,343,317 B2* | 3/2008 | Jokinen | ............... | G06Q 30/0207 455/418 |
| 7,769,634 B2* | 8/2010 | Leung | ................ | G06Q 30/0211 705/14.1 |
| 8,352,307 B2* | 1/2013 | Moukas | ............. | G06Q 30/0242 705/7.29 |
| 8,527,347 B2* | 9/2013 | Pulijala | .............. | G06Q 30/0275 705/14.66 |
| 8,554,626 B2* | 10/2013 | Pulijala | .............. | G06Q 30/0267 705/14.69 |
| 8,577,803 B2* | 11/2013 | Chatterjee | ............ | G06Q 20/326 705/41 |
| 8,879,389 B2* | 11/2014 | Pulijala | .............. | G06Q 30/0275 370/252 |

(Continued)

FOREIGN PATENT DOCUMENTS

| | | | | |
|---|---|---|---|---|
| JP | 11154184 A | * | 6/1999 | ............. G06F 17/60 |
| JP | 2004133884 A | * | 4/2004 | ........... G06Q 20/123 |

(Continued)

OTHER PUBLICATIONS

Pass2U. "Digitize Cards And Tickets to Apple Wallet / Google Wallet." (Apr. 12, 2013). Retrieved online Sep. 2, 2022. https://www.pass2u.net/ (Year: 2013).*

(Continued)

*Primary Examiner* — James A Reagan

(74) *Attorney, Agent, or Firm* — Bishop Diehl & Lee, Ltd.

(57) ABSTRACT

A streamlined method for displaying advertising content in a mobile environment utilized device detection and smart-links to minimize the number of steps necessary for an end user to select and store a pass or similar marketing device. In various exemplary embodiments, a single click on a banner advertisement allows the user to initiate an application, program, protocol or the like that stores the pass or similar marketing device in the particular type of digital wallet used by the end user.

10 Claims, 1 Drawing Sheet

(56) References Cited

U.S. PATENT DOCUMENTS

| | | | |
|---|---|---|---|
| 8,909,771 B2 * | 12/2014 | Heath | G06Q 30/02 709/224 |
| 9,785,973 B2 * | 10/2017 | Tollinger | G06Q 30/02 |
| 9,805,370 B1 * | 10/2017 | Quigley | H04W 12/033 |
| 10,192,216 B2 * | 1/2019 | Hammad | G06Q 20/353 |
| 10,740,797 B2 * | 8/2020 | Li | G06Q 30/0261 |
| 10,853,797 B2 * | 12/2020 | Hammad | G06Q 20/3227 |
| 11,042,905 B2 * | 6/2021 | Tollinger | G06F 40/186 |
| 2006/0190331 A1 * | 8/2006 | Tollinger | G06Q 30/0276 705/14.27 |
| 2007/0088801 A1 * | 4/2007 | Levkovitz | H04L 12/1859 709/217 |
| 2007/0088851 A1 * | 4/2007 | Levkovitz | G06Q 30/0276 709/246 |
| 2007/0088852 A1 * | 4/2007 | Levkovitz | H04L 67/53 709/246 |
| 2007/0244929 A1 * | 10/2007 | Huang | G06Q 30/0277 707/999.102 |
| 2007/0294096 A1 * | 12/2007 | Randall | G06Q 20/322 455/466 |
| 2008/0040215 A1 * | 2/2008 | Huang | G06Q 30/02 707/999.107 |
| 2009/0089131 A1 * | 4/2009 | Moukas | G06Q 30/0267 705/70 |
| 2010/0138299 A1 * | 6/2010 | Preston | G06Q 30/0261 715/765 |
| 2010/0138303 A1 * | 6/2010 | Preston | G06Q 30/0269 705/14.72 |
| 2011/0066488 A1 * | 3/2011 | Ludewig | G06Q 30/0244 705/14.43 |
| 2011/0143731 A1 * | 6/2011 | Ramer | H04M 3/493 455/414.1 |
| 2011/0145049 A1 * | 6/2011 | Hertel | G06Q 30/0267 705/41 |
| 2011/0153428 A1 * | 6/2011 | Ramer | G06Q 30/00 705/14.64 |
| 2012/0010979 A1 * | 1/2012 | Ramer | G06Q 30/0247 705/14.46 |
| 2012/0066057 A1 * | 3/2012 | Ramer | G06Q 30/0247 705/14.46 |
| 2012/0179534 A1 * | 7/2012 | Moukas | G06Q 30/0241 705/14.41 |
| 2012/0221421 A1 * | 8/2012 | Hammad | G06Q 10/00 705/16 |
| 2012/0278185 A1 * | 11/2012 | Ramachandran | G06Q 30/02 705/14.73 |
| 2012/0289263 A1 * | 11/2012 | Link, II | G06Q 30/02 455/466 |
| 2012/0310826 A1 * | 12/2012 | Chatterjee | G06Q 20/36 705/41 |
| 2013/0041734 A1 * | 2/2013 | Dean | G06Q 30/0207 705/14.23 |
| 2013/0053005 A1 * | 2/2013 | Ramer | H04W 4/025 455/414.1 |
| 2013/0055097 A1 * | 2/2013 | Soroca | G06Q 30/0246 715/738 |
| 2013/0073336 A1 * | 3/2013 | Heath | G06Q 30/02 705/7.29 |
| 2013/0073388 A1 * | 3/2013 | Heath | G06Q 50/01 705/14.53 |
| 2013/0191213 A1 * | 7/2013 | Beck | G06Q 30/0207 705/14.64 |
| 2013/0290203 A1 * | 10/2013 | Purves | G06Q 20/12 705/319 |
| 2013/0346302 A1 * | 12/2013 | Purves | G06Q 20/102 705/40 |
| 2014/0006129 A1 * | 1/2014 | Heath | G06Q 30/02 705/14.23 |
| 2014/0032302 A1 * | 1/2014 | Li | G06Q 30/0267 705/14.64 |
| 2014/0040127 A1 * | 2/2014 | Chatterjee | G06Q 20/322 705/41 |
| 2014/0074637 A1 * | 3/2014 | Hammad | G06Q 20/351 705/41 |
| 2014/0180825 A1 * | 6/2014 | Ramer | G06Q 30/0269 705/14.64 |
| 2015/0269625 A1 * | 9/2015 | Campbell | G06Q 30/0267 705/14.64 |
| 2016/0034954 A1 * | 2/2016 | Tollinger | G06F 16/9535 705/14.67 |
| 2016/0321701 A1 * | 11/2016 | Tollinger | G06Q 30/0241 |
| 2018/0285987 A1 * | 10/2018 | Purves | G06F 16/972 |
| 2019/0108509 A1 * | 4/2019 | Hammad | G06Q 20/3278 |
| 2021/0027279 A1 * | 1/2021 | Hammad | G06Q 20/351 |

FOREIGN PATENT DOCUMENTS

| | | | |
|---|---|---|---|
| WO | WO-3094134 A2 * | 11/2003 | |
| WO | WO-2010118775 A1 * | 10/2010 | G06Q 30/02 |

OTHER PUBLICATIONS

Masterpass. "Fly through checkout with Masterpass." (Feb. 12, 2014). Retrieved online Sep. 2, 2022. https://masterpass.com/en-nl.html (Year: 2014).*

Áine Doherty. "Mobile Marketing: Exploiting the New Wave of Innovation in Marketing." (Oct. 2013). Retrieved online Sep. 2, 2022. (Year: 2013).*

Stewart Wolpin. "How 'NFC' and Mobile Wallets Will Change the Way Retailers Do Business." (Sep. 11, 2012). Retrieved online Sep. 2, 2022. https://www.entrepreneur.com/article/224381 (Year: 2012).*

Lisa Peterson et al. "Location-Based Advertising The Key to Unlocking the Most Value in the Mobile Advertising and Location-Based Services Markets." (Dec. 2009). Retrieved online Sep. 2, 2022. https://www.mmaglobal.com/files/Peterson Mobility_20100217144146.pdf (Year: 2009).*

MMA. "The Mobile Marketing Roadmap. How Mobile is Transforming Marketing for Targeting Next Generation Consumers." (Aug. 15, 2012). Retrieved online Sep. 2, 2022. https://www.mmaglobal.com/files/documents/mobilemarketingroadmap.pdf (Year: 2012).*

* cited by examiner

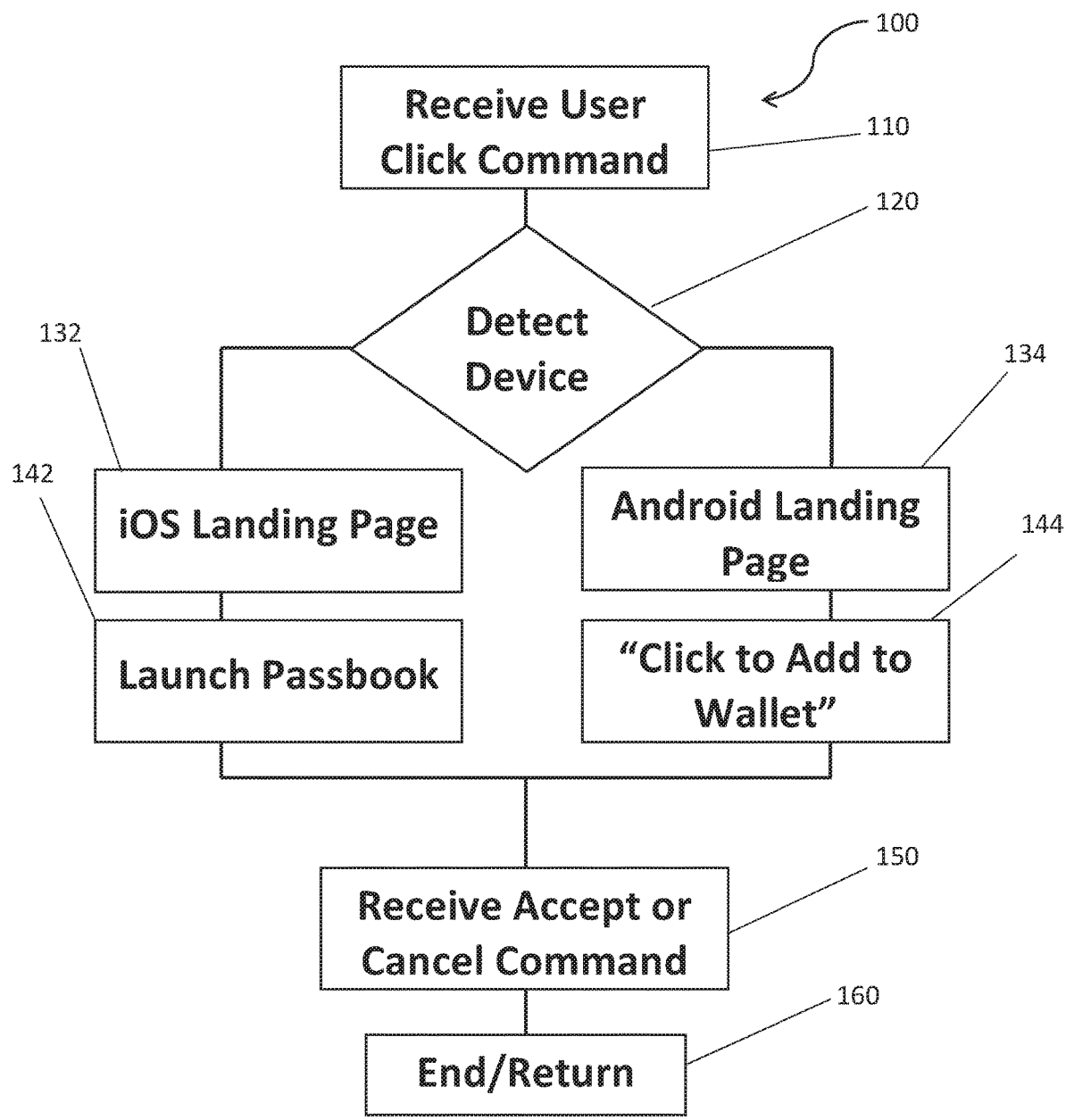

STREAMLINED MOBILE ADVERTISING FOR DIGITAL PASSES

CROSS-REFERENCE TO RELATED APPLICATION

The present application is a Continuation of U.S. patent application Ser. No. 14/663,928, titled "Streamlined Mobile Advertising For Digital Passes" and filed on Mar. 20, 2015, which claims the benefit of U.S. Provisional Patent Application Ser. No. 61/968,011 filed on Mar. 20, 2014, the disclosure of which is hereby incorporated by reference in its entirety.

TECHNICAL FIELD OF THE INVENTION

The present invention relates to a system and method for storing digital marketing content. In particular, the present invention relates to a streamlined process for storing digital marketing content retrieved from a remote server over the Internet on a mobile device.

BACKGROUND OF THE INVENTION

Coupons, tickets, loyalty cards, boarding passes and other marketing content has transitioned from the traditional paper documents to digital items offering a broader range of customization. These digital items are often referred to as "passes" ("pass" singular). These passes may be downloaded to, generated on, or otherwise accessed by a mobile computing device, such as a smartphone or wi-fi connected device like an iPod touch, iPad, tablet computer or the like. In typical use, a pass is stored in a digital wallet for access and use at a later time or location.

The digital wallet and pass also allows direct marketing communication to the end user. For example, a pass may be designed such that the marketer who generated the pass can inform an end user that the pass is about to expire or has been updated. One example of a pass and electronic wallet system is the Passbook app available in the iOS operating system from Apple, Inc. Another example is the Google Wallet available in the Android operating system from Google, Inc.

SUMMARY OF THE INVENTION

Mobile advertising is online advertising that is optimized for viewing while a user browses the Internet or uses a mobile app on a mobile device. Online retailers and website designers often provide a dedicated mobile version of their websites that is optimized for viewing on a mobile device such as a cellular phone, tablet, PDA, portable media player, or the like. These mobile versions of websites are designed to be more easily accessed and viewed on smaller screens having lower screen resolutions and, often, slower data transfer speeds that typically plague mobile devices. These mobiles versions of websites may additionally be designed to more easily utilize touch screen interaction to take advantage of the prevalence of touch screens on mobile devices.

Online advertising is often optimized for mobile browsing. Mobile advertising typically utilizes smaller banner ads with reduced graphic intensity to account for the smaller screen and lower screen resolution of mobile devices. Additionally, mobile versions of websites and mobile advertising may limit or exclude certain design elements that are not compatible with various mobile devices. For example, mobile versions of websites and mobile advertising may limit or exclude the use of Adobe Flash or other software platforms that are not supported by various mobile devices.

It would be desirable to provide a streamlined procedure for end users to access and store digital marketing devices such as passes through mobile advertising.

BRIEF DESCRIPTION OF THE DRAWINGS

For the purpose of facilitating an understanding of the subject matter sought to be protected, there is illustrated in the accompanying drawing, embodiments thereof, from an inspection of which, when considered in connection with the following description, the subject matter sought to be protected, its construction and operation, and many of its advantages should be readily understood and appreciated.

FIG. 1 is a schematic flow chart of an exemplary method of storing a digital marketing device according to this invention.

DETAILED DESCRIPTION OF THE PREFERRED EMBODIMENTS

In an exemplary embodiment of a marketing system and method according to this invention, a marketer creates a pass or other storable digital marketing content and a mobile banner advertisement. The mobile banner advertisement is programmed to send the user to a site that will identify the device being used by a user who has been presented the mobile banner advertisement on a mobile website.

When a user clicks on the mobile banner advertisement (or touches the mobile banner advertisement on a touch-screen device), the mobile banner advertisement opens a mobile web page that determines the device being used (i.e., a mobile smartlink) as well as it's characteristics like operating system, and browser version. The site then redirects to mobile wallet content associated with the identified device being used by the user. For example, in various exemplary embodiments, if the user is using a version of an iPhone manufactured and sold by Apple, Inc., the mobile banner advertisement may open the Passbook application or program installed on the phone. In various exemplary embodiments, if the user is using a mobile device that operates on the Android Operating System created by Google, Inc., the mobile banner advertisement may open the Google Wallet application or program installed on that device. It should be appreciated that the device detection may operate by identifying the web browsing program utilized by the user device, by identifying the operating system utilized by the user device or by identifying another known characteristic that is expected to correlate with a particular mobile device or a particular class of mobile devices on the market.

It should be appreciated that the mobile wallet may be provided by a third-party outside of the device operating system, such as PayPal, Square, or Samsung.

It should also be appreciated that the mobile wallet associated with the identified device may be any known or later developed mobile wallet application or program. In various exemplary embodiments, the particular mobile wallet being utilized by the user is identified through the same or similar device detection process used to identify the device being used by the user. In such exemplary embodiments, the mobile smartlink may identify the mobile wallet being used by the user rather than or in addition to identifying the device being used.

Upon opening the mobile wallet, the user is presented with a pass or similar digital marketing device and an option to store the pass or similar digital marketing device in the user's mobile wallet for later use or interaction. If the user chooses to store the pass or similar digital marketing device in the user's mobile wallet, the mobile wallet is updated to include the pass or similar digital marketing device and the web browser is returned to the mobile website that initially presented the mobile banner advertisement. If the user does not choose to store the pass or similar digital marketing device, the mobile wallet is not updated and the web browser is returned to the mobile website that initially presented the mobile banner advertisement.

It should be appreciated that, in various exemplary embodiments, rather than opening a mobile wallet application or program, the mobile banner advertisement may initiate an "intermediary" window or similar device within the web browser application or program that similarly provides the option to store the pass or similar marketing device in the user's mobile wallet. In such exemplary embodiments, the mobile wallet application or program may not need to be opened or launched in order to update the contents of the mobile wallet application or program. It should also be appreciated that the mobile banner advertisement may be presented in applications other than web browsers and may launch or access mobile web pages without involvement of a dedicated web browser application. In such instances, after the user chooses whether to store the pass or similar digital marketing device, whatever application originally presented the mobile banner advertisement may return to its previous screen or condition.

In various exemplary embodiments, if the smartlink cannot identify the device being used or cannot identify the mobile wallet being used or corresponding to the identified device, the smartlink may direct the web browser application or program being used by the user to a mobile website associated with the mobile banner advertisement. For example, if the smartlink determines that the user is using a mobile device that does not have an associated mobile wallet, clicking on the mobile banner advertisement (or touching it on a touch screen device) may forward the user's web browser application or program to a desired mobile website.

It should be appreciated that, while various functions, actions or operations described above are described in relation to being performed or executed by the mobile banner advertisement, in practice, the various functions, actions or operations may be performed or executed by the mobile device, a web browser application or program on the mobile device or a processor associated with the mobile device. The above-described functions, actions or operations are described as being performed or executed by the mobile banner advertisement to indicate that the mobile banner advertisement is programmed or otherwise designed to generate the desired actions of the mobile device or the web browser application/program or processor associated with the mobile device.

FIG. 1 shows a representative flowchart 100 of a method of presenting a mobile advertisement according to an exemplary embodiment. In the flow chart, an end user is presented with a mobile banner advertisement. The mobile banner advertisement will generally display information related to a pass or marketing device that can be stored or saved by the end user. As outlined above, the mobile banner advertisement may be presented to the end user on a mobile website accessed via a web browser or as an advertisement within any other type of application running on a mobile device. In step 110, the mobile advertisement is selected or activated when a command is received indicating that the user has pressed or clicked on the advertisement. The process then continues to step 120 where the device being used by the user is detected. This may include detecting the type and version of mobile device being used, the type and version of application or web browser being used, and/or the type and version of operating system being used by the end user.

Depending on the results of the device detection, the process continues along different branches. For example, in the embodiment shown in FIG. 1, if the device is detected as running the IOS operating system from Apple, Inc., then the process continues to step 132 and a dedicated iOS Landing Page is launched. It should be appreciated that the iOS Landing Page may never be shown to the end user. That is, the iOS Landing Page may simply be dedicated programming language usable to initiate the mobile wallet features applicable to devices running the iOS operating system. The process then continues to step 142 where the Passbook application or protocol is launched. This application or protocol will present the user with an option to store the pass or marketing device originally advertised in the mobile banner advertisement. If the user selects "store" then the pass or marketing device is stored in the user's Passbook application. Alternatively, the user can select cancel. This decision is received in step 150. In either event, as shown in step 160, the Passbook application or protocol is terminated and the end user is returned to the web browser page, or application condition present before the click command was received in step 110.

In an alternative path, if the device detected in step 120 is determined to be a device running a version of the Android operating system from Google, Inc., then the process continues to step 134 where an Android Landing Page is launched. As with the iOS Landing Page discussed above with relation to step 132, it should be appreciated that the Android Landing Page may not be shown to the end user. However, in various exemplary embodiments, the Android Landing Page is a dedicated landing page that includes a button for the end user to add the desired pass or marketing device to the user's digital wallet. This may include a message such as "Click here to add to Google Wallet" or the like. The click command is received in step 144 and the user is presented with an option to confirm or cancel the addition. The decision is received in step 150 and the process continues to step 160 as discussed above. It should be appreciated that the click command received in step 144 may take the place of the confirmation received in step 150. That is, the user may be presented with a single option at step 144 to add the pass or marketing device or cancel the process. In either event, the process will continue to step 160 to return the end user to the previous webpage or application condition.

It should be appreciated that the flow-chart shown in FIG. 1 is simplified for the purposes of discussion and considers only a subset of the decision tree. Additional steps may be added as desired. For example, additional branches may be added to account for other known or later-developed operating systems and mobile device types. For example, a branch may be added to interact with users who use a version of the Windows operating system or to account for situations where the end user's device type cannot be accurately detected.

In various exemplary embodiments, a method of generating or presenting a pass or digital marketing device also utilizes user identification or tracking. The user identification or tracking can improve the user experience by customizing or personalizing various features and options.

These features may also provide added functionality to marketers authoring the passes or digital marketing devices.

In various exemplary embodiments, when a user activates a mobile banner advertisement, a unique identification device associated with the user is generated or accessed. Such an identification device may be, for example, a code, file, configuration setting, or similar item saved on the user's device that identifies the user to the service that issued the advertisement; for example, a customer loyalty number, user id, screenname or the like. In such exemplary embodiments, the unique identification device may be passed to or retrieved by the server that manages the pass digital marketing device as a means of identifying the user that has activated the mobile banner advertisement. In such exemplary embodiments, the unique identifier may be passed to or retrieved by a server or system that displayed the mobile banner advertisement with an indication of whether the end user completed the process of storing the pass or digital marketing device. The server hosting the mobile banner advertisement may use this information to track the number or percentage of user who begin to load the advertisement (i.e., users who clicked on the advertisement) and the number or percentage of users who complete the process and load or store the pass or digital marketing device into their digital wallets.

It should be appreciated that privacy concerns may necessitate limiting the access or specificity of the unique identification device. In various exemplary embodiments, a temporary identification device is generated when a mobile banner advertisement is activated. In such exemplary embodiments, the temporary identification device is passed to the end user's device by a server that is hosting the mobile banner advertisement and is passed back to or retrieved by the server when the user completes the process and stores or loads the pass or digital marketing device into a digital wallet.

In various exemplary embodiments, a persistent identification device is associated with each user who activates a mobile banner advertisement and loads or stores a pass or digital marketing device. In such exemplary embodiments, the persistent identification device identifies the particular pass or digital marketing device and the user. In various ones of these exemplary embodiments, the persistent identification device allows individualized updating, deleting or otherwise modifying the pass or digital marketing device stored or loaded by the user.

For example, the end user may decide to change a preference related to the digital wallet asset; to do so, the configuration change and persistent identification device are sent to a server that manages the pass or digital marketing device and the server makes the corresponding change to the pass or digital marketing device. In various exemplary embodiments an advertiser may also be able to change individual passes or digital marketing devices for specific users without changing the passes or digital marketing devices for other users. For example, the advertiser may reward certain customers for frequent visits, participation in special events or any other criteria. Likewise, the advertiser may be able to track the performance of various advertising campaigns by tracking the number or percentage or users who were shown mobile banner advertisement (e.g., impressions), the number or percentage of users who activated the mobile banner advertisement (e.g., click through rate), the number of percentage of users who stored or loaded the pass or digital marketing device into a digital wallet (e.g., conversions), and the number or frequency of users who subsequently used the pass or digital marketing device.

In various exemplary embodiments, a method of loading a pass or digital marketing device also includes location detection. For example, if the pass or digital marketing device is associated with a national chain business with numerous locations, a subset of locations particularly relevant to the end user may be loaded into the pass or digital marketing device at the time the pass or digital marketing device is stored or loaded into a digital wallet. In various exemplary embodiments, the pass or digital marketing device is loaded with a predetermined number of locations based on an estimated location determined from an IP address associated with the end user's device. In various other exemplary embodiments, the pass or digital marketing device may be loaded with locations based on general or specific location information retrieved from the end user's device. For example, a GPS receiver may be activated to determine an exact location, a cell tower may be pinged to determine a general location or a location may be loaded from a user profile, configuration file or preferred settings.

The following is a description of an exemplary embodiment of a user's interaction with a mobile advertising system and method according to the present invention. In the exemplary embodiment, a user is browsing the Internet on a mobile computing system, such as a mobile phone, in particular a version of the iPhone sold by Apple, Inc. While browsing the Internet, the user is presented with a mobile banner advertisement that advertises a coupon for product the user is interested in and includes an invitation to add the coupon to the user's mobile wallet. In various exemplary embodiments, the mobile banner advertisement may present a different message depending on the device being used by the user. For example, the mobile banner advertisement may present an icon, image or text that includes "add this coupon to Passbook" or the like if the user is using a version of the iPhone and conversely may present an icon, image or text that includes "add this couple to Google Wallet" or the like if the user is using a mobile device that utilizes the Android Operating System.

In the above-presented exemplary embodiment of a user's interaction, if the user presses or touches the mobile banner advertisement, the user is presented with a screen that shows a pass or other digital marketing device associated with the advertised coupon and includes options to "Add" or "Cancel." If the user selects "Add," the pass or other digital marketing device is added to the Passbook application or program on the user's mobile device and the screen returns to the previous mobile website. If the user selects "Cancel," the screen simply returns to the previous mobile website.

In another exemplary embodiment of a user's interaction with a mobile advertising system and method according to this invention, the user has just purchased a gift certificate or prepaid card associated from a desired business mobile website. Upon completing the purchase through the mobile website (e.g., utilizing a web browser application or program on a mobile device), the user is presented with a link inviting the user to add the gift certificate or prepaid card to the user's mobile wallet. It should be appreciated that the mobile website may utilize known or later-developed device detection processes to present a different message such as "add this gift card to Passbook" or "add this gift card to Google Wallet" depending on the mobile device being used by the user. Upon selecting, clicking or pressing the message, the user is presented with a screen that shows a pass or other digital marketing device that represents the gift certificate or prepaid card and includes options to "Add" or "Cancel." If the user selects "Add," the pass or other digital marketing device is added to the associated mobile wallet application or program on the user's mobile device and the screen returns to the previous mobile website. If the user selects "Cancel," the screen simply returns to the previous mobile website.

It should be appreciated that while the above outlined interactions are described in relation to a coupon and a gift certificate or prepaid card, the described method may be used with any suitable pass or marketing device. For example, in various exemplary embodiments, a confirmation screen presented to a user who has purchased a ticket for a show, movie, concert, airline flight, bus ride or the like may present the user with the option to add that ticket to the user's mobile wallet. Likewise, a mobile banner advertisement may be designed to advertise a sales flyer or event that may similarly be added to the user's mobile wallet. Further, a mobile website for a business may include a link that invites the user to create a loyalty card or similar digital marketing device as a pass in the user's mobile wallet.

Upon being added to a mobile wallet, the pass or similar digital marketing device may allow the marketer to update the pass through remote means or otherwise interact with and communicate with the user through known or later developed methods.

It should be appreciated that marketers can use the information obtained through the use of this process to determine the performance of each campaign. This information can be used to influence the greater spend of advertising dollars moving forward to target consumers who are similar to those who have downloaded the mobile wallet content.

It should be appreciated that a marketing system according to any of the above-outlined or other exemplary embodiments may also be capable of determining if a user is using a non-mobile device such as a desktop or laptop computer. In such exemplary embodiments, if the end user is determined to be using a non-mobile device, the mobile banner advertisement may activate an expanded advertising unit when activated (e.g., a pop-up or "blow-up advertisement). Alternatively, or additionally, the mobile banner advertisement may redirect to a dedicated landing page. In various exemplary embodiments, if the end user is detected as using a non-mobile device, the end user may be presented with options to add the pass or digital marketing device to another mobile device.

In various exemplary embodiments, a dedicated landing page asks the end user to enter a phone number associated with a mobile device. A unique SMS (short message service) message may then be sent to the phone number that includes a unique identifier or a device associated with a unique identifier. The SMS message may also operate as a weblink to initiate the device detection and pass or digital marketing device procedures according to any of the above-outlined or other exemplary embodiments.

In various other exemplary embodiments, the user may be presented with multiple options to add the pass or digital marketing device to a mobile device with each option necessarily indicating the type of mobile device. For example, the user may be presented with a landing page that includes options to "Add to Google Waller" or "send to my iPhone." After receiving a selection from the user, along with a phone number, a unique SMS message is sent to the number, the SMS message operating as a link to initiate the storing or loading of the pass or digital marketing device to the relevant digital wallet associated with the selected device type.

What is claimed is:

1. A method of providing a digital marketing device through mobile advertisements to be stored directly on an identified mobile device, the method comprising:
   creating a digital marketing device at a desired web page operating on a server;
   creating a mobile advertisement comprising program code linking to the desired web page, wherein the mobile advertisement is configured to be displayed upon operation of at least one mobile device application;
   running an application of the at least one mobile device applications on a mobile device having a display and a mobile wallet;
   automatically displaying the mobile advertisement on the mobile device display;
   selecting the mobile advertisement by a user via a selection mechanism on the mobile device;
   generating a unique identification device associated with the mobile device;
   sending the unique identification device associated with the mobile device to the server to be recorded;
   linking the mobile device to the desired web page;
   initiating a device detection system on the web page to determine an operating system running on the mobile device;
   selecting a desired landing page from multiple potential landing pages based on the operating system running on the mobile device as determined by the device detection system;
   opening the desired landing page on the mobile device;
   prompting the user to store the digital marketing device to the mobile wallet of the mobile device;
   adding the digital marketing device to the mobile wallet from the landing page upon an election by the user; and
   associating the addition of the digital marketing device to the mobile wallet with the unique identification device stored on the server.

2. The method of claim 1, wherein the digital marketing device is optimized for being added to mobile devices running the determined operating system.

3. The method of claim 1, further comprising interacting with the user of the mobile device through the digital marketing device added to the mobile wallet.

4. The method of claim 3, wherein interacting with the user of the mobile device comprises updating the digital marketing device.

5. The method of claim 1, further comprising the step of determining a preferred mobile wallet application installed on the mobile device.

6. The method of claim 1, wherein the desired landing page is an iOS landing page if the operating system is determined to be a version of the iOS operating system from Apple, Inc.

7. The method of claim 6, further comprising initiating a passbook protocol.

8. The method of claim 1, wherein the desired landing page is an Android landing page if the operating system is determined to be a version of the Android operating system from Google, Inc.

9. The method of claim 1, further comprising determining a general location of the user of the mobile device.

10. The method of claim 9, wherein the digital marketing device is particularized for the general location of the user of the mobile device.

* * * * *